Feb. 7, 1961  R. E. KNUTSON  2,970,386
ARITHMETIC INSTRUCTING AID CIRCUIT
Filed Nov. 26, 1958
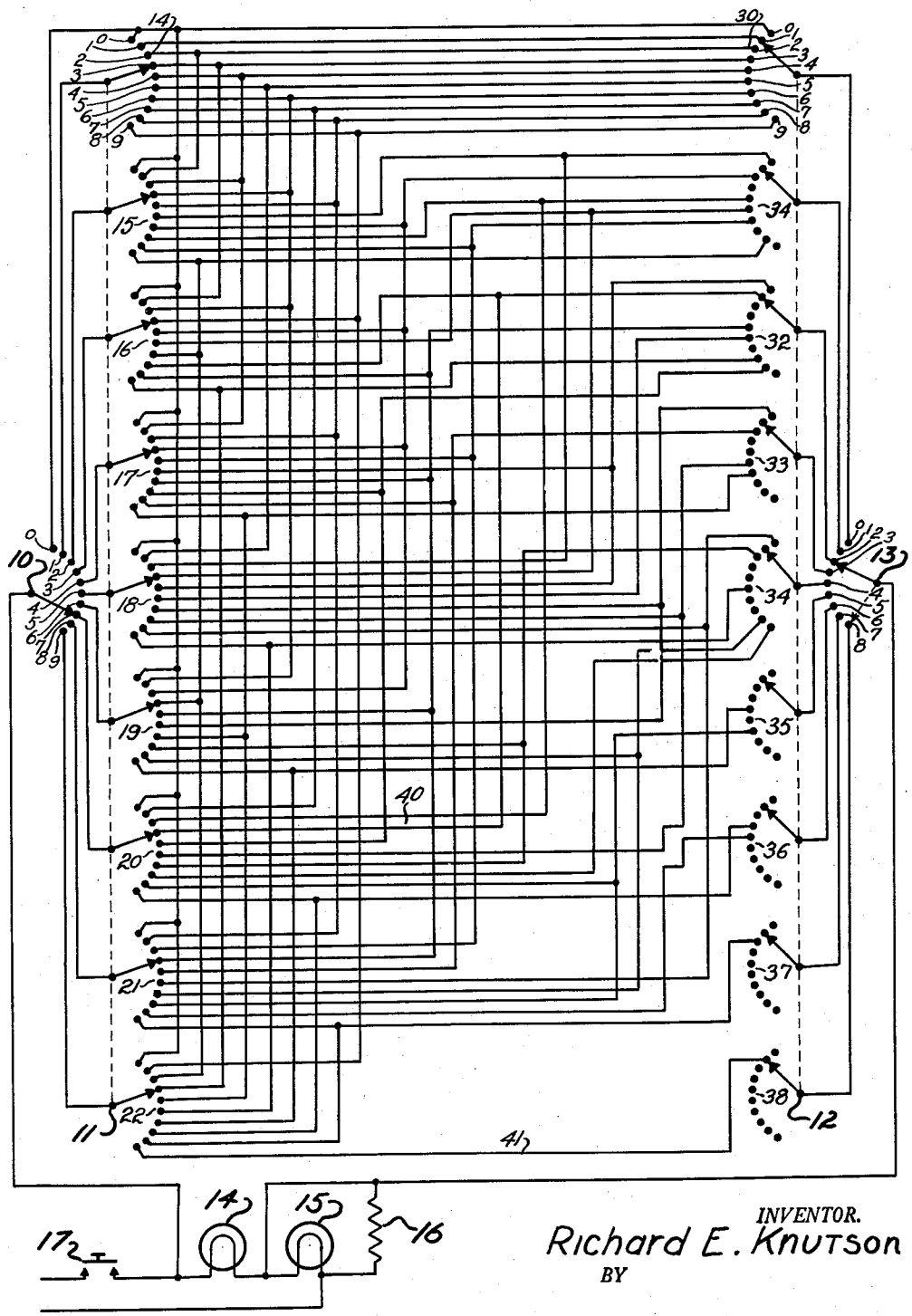
INVENTOR.
Richard E. Knutson
BY

United States Patent Office 2,970,386
Patented Feb. 7, 1961

2,970,386

ARITHMETIC INSTRUCTING AID CIRCUIT

Richard E. Knutson, 1804 Anderson Place SE.,
Albuquerque, N. Mex.

Filed Nov. 26, 1958, Ser. No. 776,477

9 Claims. (Cl. 35—9)

This invention relates to a circuit for an arithmetic instructing aid which will provide a right or wrong indication when a given arithmetic question and answer are presented to be evaluated.

The growing need for the development of educational aids to provide a stimulation for learning has prompted the development of this invention. The main device relied upon in the past as an instructing aid in arithmetic has been flash cards, which provide but little stimulation as the child is merely reading a card and no unique indication is provided by a correct solution. Recent use has been made of electrical multiple choice boards which do give a positive indication if a correct solution has been selected, but only confront the student with an array of answers from which to choose where, because of the number involved, not every possible answer the student might have chosen will be available.

It is therefore the object of this invention to provide a stimulating approach to arithmetic teaching by providing a system that will provide the student with the incentive of actually being able to operate a physical device.

A further object of the invention is to provide a system where the student can introduce any question and any answer (up to the limits of the system) and receive a positive and unique indication of a correct solution if the one right answer is presented. This system will also provide an indication of a wrong solution if any other solution is presented but the right one.

Other objects and advantages of the present invention will be apparent from the following specification taken in conjunction with the drawings made a part hereof and the description of a presently preferred embodiment.

The drawing shows how the combination of four circuit selecting switches plus two incandescent bulbs, one resistor, and a push button switch can be utilized to provide an efficient system for providing right and wrong indications for various combinations of arithmetic questions and answers.

The system makes use of four rotary switches 10, 11, 12, and 13. Of these four switches, 10 and 13 have single decks and 11 and 12 have nine decks ganged mechanically. The decks of switch 11 are numbered 14 through 22, while the decks of switch 12 are numbered 30 through 38. Switches 10, 11 and 12 will rotate through ten positions representing the digits from 0 through 9 as exemplarily designated at the single deck of switch 10 and at decks 14 of switch 11 and 30 of switch 12. Switch 13 rotates through nine positions representing the digits from 0 through 8 as exemplarily designated at the single deck thereof. As the switches are rotated the moveable contact in each deck separately joins with the stationary contacts. Switches 10 and 11 rotate from 0 to 9 clockwise, while switch 12 rotates from 0 to 9 counterclockwise and switch 13 rotates from 0 to 8 counterclockwise. The settings of switches 10 and 11 correspond to the question being presented to the system, while the setting of switches 12 and 13 correspond to the answer, with the setting of switch 13 indicating the number of tens and the setting of switch 12 indicating the number of units in the answer. Only if the correct solution to a problem is selected will a complete path be traced through all four switches and interconnecting wires which will in turn short out lamp 14 (the lamp indicating an incorrect solution) enabling lamp 15 (the lamp indicating a correct solution) to light when power is applied to the input and push button 17 is pressed. If any solution other than the correct solution is selected and button 17 pressed, with power supplied to the input, lamp 14 will light with lamp 15 now not lighted because resistor 16 in parallel with lamp 15 is much lower in resistance than either lamp consequently the voltage drop across the parallel combination of lamp 15 and resistor 16 is not enough to make lamp 15 light.

A better understanding of the invention may be received by following the operation of the system for the switch settings indicated on the accompanying drawing. The drawing is an application of the system to perform multiplication instruction. Switches 10 and 11 are set respectively in position seven and three. Their settings then correspond to the question or the two numbers to be multiplied together. Switch 13 is indicated in position two which corresponds to the number of tens in the answer, while switch 12 is indicated in position one which corresponds to the number of units in the answer and which when combined with the setting of switch 13 would indicate that the answer selected is twenty one. This example truly is the correct solution to a given problem (seven times three equals twenty one) so a complete path 40 through the four switches is evident, as follows: Beginning at switch 10 there is continuity from one side of lamp 14 through the movable contact, stationary contact 7, the movable contact and stationary contact 3 of bank 20 of switch 11, interconnecting wiring, stationary contact 1 and the movable contact of bank 32 of switch 12, stationary contact 2 and the movable contact of switch 13, to the other side of lamp 14. As was previously described, this completed path for a correct solution will short out lamp 14 letting lamp 15 light when voltage is applied to the input terminals and the button 17 is pressed. It can be further seen that any solution other than the one illustrated will not present a complete path to short out lamp 14 when the question asked is seven times three; consequently, with an incorrect solution, lamp 14 will light. Supposing, for instance, that switch 13 is set to position 8 shown in broken lines, indicating together with switch 12 an answer of 81: Beginning again at switch 10 as before, there is continuity up to stationary contact 2 of switch 13, then, since the movable contact is on stationary contact 8 instead, there is not a continuous path to short out lamp 14. Tracing from another direction, path 41 is seen not to be continuous: Starting from the movable contact of switch 13 and one side of lamp 14, there is continuity through stationary contact 8, the movable contact and stationary contact 1 of bank 38 of switch 12, only to stationary contact 9 of bank 22 of switch 11. There the continuity is broken due to the setting of switch 11 on position 3 instead of position 9.

It is seen from these examples that the various switches are wired to one another to present continuity across lamp 14 when switches 10 and 11 are set to digits to be multiplied, and simultaneously switches 12 and 13 are set to the correct answer or product. The wiring of the switches is easily determined by first setting up a multiplication table for all of the possible digits to be represented by switches 10 and 11. In the preferred embodiment shown all digits from 0 through 9 can be multiplied, so a multiplication table for these digits is set up.

Then, starting with only the switches in a circuit diagram, correct settings can be made for all of them, and correct wiring added to provide the needed continuity across lamp 14 for every product in the table. The result is shown in the drawing.

The necessity for 9 banks in switch 11 is explained by the fact that for every possible setting of switch 10 there are 9 possible digits (excepting 0) which can be multiplied by the digit represented by that setting, each such multiplication yielding a different answer and hence requiring a different path through switches 12 and 13. Since 0 times any of the other digits equals 0, the 0 stationary contact of switch 10 does not require a corresponding bank in switch 11. Instead, the wiring goes directly over to the 0 stationary contact of bank 30 of switch 12.

The necessity for 9 banks in switch 12 is explained by the fact that for every digit setting of switch 13 (representing the tens in the answer) there are 9 possible units. Of course, not all of the possible combinations are represented in the multiplication table so there are not connections made to all the stationary contacts of switch 12.

Using this same philosophy but simply reversing the question and answer switches or modifying the wiring could make this same arithmetic instructing circuit usable for instructing addition, subtraction, and division as well as multiplication as shown in the drawing.

The performance of the invention described above and shown on the drawing is only to be considered as an example, and the details of the invention can be modified in many different ways within the scope of the patent claim. The lamps and the switches may be of several types and the system may be operated from many types of power supplies.

What is claimed is:

1. An arithmetic instruction aid circuit for the practice of engaging two digits in an arithmetic computation to secure an answer, comprising: a first switch having a deck with a movable contact and a plurality of stationary contacts corresponding to the number of desired choices of digits for one of said computing digits; a second switch having a plurality of decks each with a movable contact and a plurality of stationary contacts corresponding to the desired choices of digits for the other of said calculating digits; a third switch having a deck with a movable contact and a plurality of stationary contacts corresponding to the possible digits representing the tens of the answer; a fourth switch having a plurality of decks each with a movable contact and a plurality of stationary contacts corresponding to the possible digits representing the units of the answer; interconnecting conductors between the four switches providing continuity between the movable contact of the first switch and the movable contact of the third switch when the third and fourth switches are correctly set to the answer of the computation engaging the computing digits set by means of the first and second switches; and means for indicating the presence of said continuity.

2. The arithmetic instruction aid circuit of claim 1 wherein said interconnecting conductors comprise: conductors joining stationary contacts of the first switch with movable contacts of the second switch; conductors joining stationary contacts of the second and fourth switches; conductors joining stationary contacts of the third switch with movable contacts of the fourth switch, and conductors joining stationary contacts of the first, second and fourth switches.

3. An arithmetic instruction aid circuit for the practice of multiplying together two digits to secure a product, comprising: a first switch having a deck with a movable contact and a plurality of stationary contacts corresponding to the number of desired choices of digits for one of said multiplying digits; a second switch having a plurality of decks each with a movable contact and a plurality of stationary contacts corresponding to the desired choices of digits for the other of said multiplying digits; a third switch having a deck with a movable contact and a plurality of stationary contacts corresponding to the possible digits representing the tens of the product; a fourth switch having a plurality of decks each with a movable contact and a plurality of stationary contacts corresponding to the possible digits representing the units of the product; interconnecting conductors between the four switches providing continuity between the movable contact of the first switch and the movable contact of the third switch when the third and fourth switches are correctly set to the product of the multiplying digits set by means of the first and second switches; and means for indicating the presence of said continuity.

4. The arithmetic instruction aid circuit of claim 3 wherein said interconnecting conductors comprise: conductors joining stationary contacts of the first switch with movable contacts of the second switch; conductors joining stationary contacts of the second and fourth switches; conductors joining stationary contacts of the third switch with movable contacts of the fourth switch, and conductors joining stationary contacts of the first, second and fourth switches.

5. The arithmetic instruction aid circuit of claim 4 further including means for indicating the absence of said continuity.

6. An arithmetic instruction aid circuit for the practice of multiplying together two digits to secure a product, comprising: a first switch having a deck with a movable contact and ten stationary contacts corresponding to the digits from 0 to 9 representing one of said multiplying digits; a second switch having 9 decks each with a movable contact and ten stationary contacts corresponding to the digits from 0 to 9 representing the other of said multiplying digits, each movable contact being electrically connected to an individual stationary contact of the first switch so that as the first switch is successively switched from 1 to 9, successive movable contacts of the second switch are connected in series with the movable contact of the first switch; a third switch having a deck with a movable contact and 9 stationary contacts corresponding to the digits from 0 to 8 representing the tens of the product; a fourth switch having 9 decks each with a movable contact and ten stationary contacts corresponding to the digits from 0 to 9 representing the units of the product, each movable contact being electrically connected to an individual stationary contact of the third switch so that as the third switch is successively switched from 0 to 8, successive movable contacts of the fourth switch are connected in series with the movable contact of the third switch; interconnecting conductors between the stationary contacts of the first, second and fourth switches providing continuity between the movable contact of the first switch and the movable contact of the third switch when the third and fourth switches are correctly set to the product of the multiplying digits set by means of the first and second switches; and means for indicating the presence of said continuity.

7. The arithmetic instruction aid circuit of claim 6 further including means for indicating the absence of said continuity.

8. The arithmetic instruction aid circuit of claim 7 wherein the means for indicating the presence and absence of said continuity comprise: a first electrical indicator connected between the movable contacts of the first and third switches; a second electrical indicator and a series voltage dropping device connected in parallel with the conductor joining the movable contact of the third switch and the first indicator; and means for applying electricity between the movable contact of the first switch and the junction of the second indicator and the voltage dropping device whereby the second indicator will be energized if the aforesaid continuity is present, and the first indicator will be energized if not.

9. The arithmetic instruction aid circuit of claim 8 wherein the first and second electrical indicators are lamps and the voltage dropping device is a resistor.

References Cited in the file of this patent

UNITED STATES PATENTS

| | | |
|---|---|---|
| 1,686,105 | Rothenberg | Oct. 2, 1928 |
| 1,948,712 | Hornung | Feb. 27, 1934 |
| 2,627,672 | Polton | Feb. 10, 1953 |

FOREIGN PATENTS

| | | |
|---|---|---|
| 561,004 | France | July 25, 1923 |
| 381,787 | Germany | Sept. 24, 1923 |